United States Patent
MacBean et al.

(10) Patent No.: US 12,377,965 B1
(45) Date of Patent: Aug. 5, 2025

(54) LIFTING STRUT IN THE SHAPE OF A LIFTING AIRFOIL FOR AIRCRAFT LANDING GEAR

(71) Applicant: Doroni Aerospace Inc., Coral Springs, FL (US)

(72) Inventors: Alasdair MacBean, Linton (GB); William Wood, London (GB); David Gambill, West Chester, PA (US); Doron Merdinger, Fort Lauderdale, FL (US)

(73) Assignee: Doroni Aerospace Inc., Coral Springs, FL (US)

( * ) Notice: Subject to any disclaimer, the term of this patent is extended or adjusted under 35 U.S.C. 154(b) by 0 days.

(21) Appl. No.: 18/423,408

(22) Filed: Jan. 26, 2024

(51) Int. Cl.
  *B64C 25/00* (2006.01)
  *B64C 3/14* (2006.01)
  *B64C 29/00* (2006.01)
  *B64C 39/08* (2006.01)

(52) U.S. Cl.
  CPC ............. *B64C 25/001* (2013.01); *B64C 3/14* (2013.01); *B64C 29/0016* (2013.01); *B64C 39/08* (2013.01)

(58) Field of Classification Search
  CPC .. B64C 25/001; B64C 25/00; B64C 2025/003
  See application file for complete search history.

(56) References Cited

U.S. PATENT DOCUMENTS

| | | | |
|---|---|---|---|
| 9,394,047 B2* | 7/2016 | Herzberger | B64C 25/54 |
| 11,932,386 B2* | 3/2024 | Baharav | B64D 31/16 |
| 2020/0216170 A1* | 7/2020 | Loveland | B64C 1/24 |
| 2021/0331792 A1* | 10/2021 | Sheil | B64C 29/0016 |
| 2021/0362857 A1* | 11/2021 | McCullough | B64C 11/306 |

* cited by examiner

*Primary Examiner* — Arfan Y. Sinaki
(74) *Attorney, Agent, or Firm* — James P. Demers; Cittone Demers & Arneri LLP

(57) ABSTRACT

The invention provides a landing gear strut for an aircraft which has the cross-section of an airfoil. The strut is mounted to the fuselage of the aircraft, preferably at a shallow downward angle from the horizontal, and preferably presents a positive angle of attack to the oncoming airflow. Due to the combination of an airfoil profile and a positive angle of attack, the strut is enabled to provide lift to the aircraft.

16 Claims, 2 Drawing Sheets

LIFTING STRUT IN THE SHAPE OF A LIFTING AIRFOIL FOR AIRCRAFT LANDING GEAR

FIELD OF THE INVENTION

This invention relates to aircraft lifting surfaces, and in particular to the design of lifting surfaces for compact personal aircraft.

BACKGROUND

A long-standing issue with aircraft of all sizes is that the wingspan is relatively large with respect to the size of the craft as a whole, requiring a good deal of space—typically, a large hangar—to store the craft. There have been various methods for effectively shortening the wings in applications where space is at a premium, the most successful of which are various designs of folding and swinging wings, as are commonly found on carrier aircraft. The disadvantage of folding wings is the added weight and complexity of the hinge itself, as well as any hydraulic or electrical means for effecting the folding and unfolding, and any necessary cable and/or hydraulic connections to the mechanical elements of the wing. Telescoping wings have been designed as an alternative (see e.g. U.S. Pat. No. 4,824,053), but the above problems remain, and such designs have not seen commercial use.

The problem is most acute in electrically-powered aircraft, where weight is at a premium, and light, one-piece wings, typically formed from carbon fiber composite, are virtually mandatory. Where the wingspan is limited by utility or storage requirements (e.g., personal aircraft intended for storage in a typical residential garage), the aspect ratio of the wings is severely constrained, and the search for sufficient lift turns to other structural elements of the aircraft. Chines can be sculpted into the fuselage, for example, and exposed struts can, in principle, be converted to lifting elements with an airfoil-shaped fairing. The wing trusses of the Bellanca C-27 Airbus and Aircruiser, for example, were effectively individual wings themselves, making the craft almost a biplane. The Boeing X-66 experimental airliner also features wing trusses designed to provide lift.

Airfoil-shaped fairings for landing gear have often been used to reduce drag, but in such cases the minimization of drag also minimizes any provided lift. Certain home-built kit aircraft, such as the Q1 and Q2 variants of the Rutan Quickie, and the Dragonfly Mark I, feature landing wheels installed at the wingtips of a large canard wing.

SUMMARY OF THE INVENTION

The invention provides a landing gear lifting strut capable of providing additional lift to an aircraft, without adding to the wingspan. In one embodiment, the invention provides the landing gear struts with a fairing or shell having a profile that creates added lift. In another embodiment, the struts themselves possess a lift-generating airfoil profile.

DETAILED DESCRIPTION OF THE INVENTION

Figure 1:
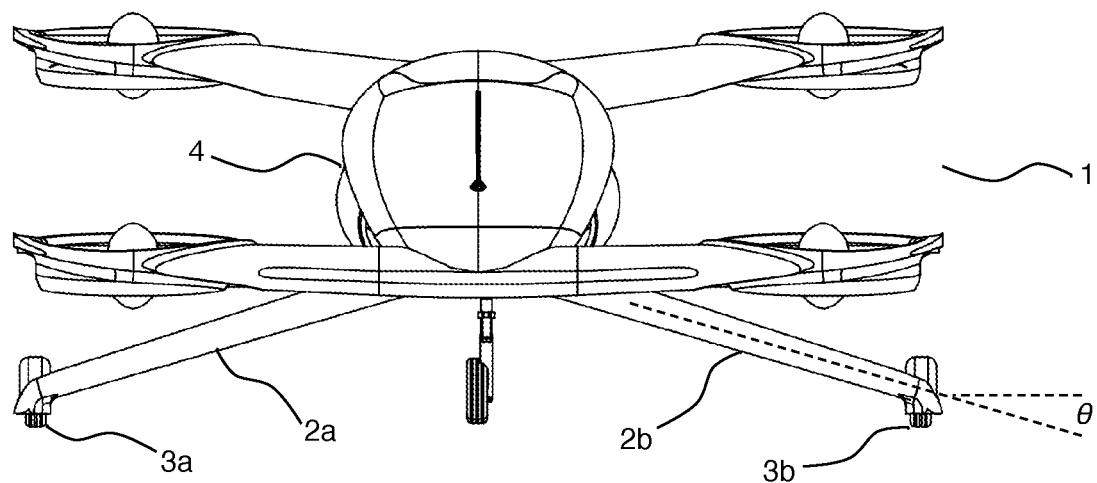
FIG. 1 is a front view of a personal aircraft fitted with two landing gear lifting struts of the invention.

In the description which follows, the term "lifting element" refers to a wing-like structure on an aircraft having the cross-section of an airfoil, which provides an upward force when the aircraft is moving forward through the air. Airfoil cross-section profiles are commonly identified by their NACA (National Advisory Committee for Aeronautics) numbers. An airfoil of the invention may be symmetrical, having no net camber between the upper and lower surfaces (a NACA 00xx foil), provided that it presents a positive angle of attack to the oncoming flow of air. Alternatively, it may be non-symmetrical, having a positive camber. Unlike the symmetrical landing gear fairings of the prior art, which are specifically designed for minimum drag, the struts of the present invention have a positive camber, and/or present a positive angle of attack to the oncoming flow of air, which does generate drag but also produces lift.

As used herein, the terms "strut" and "landing gear strut" refer to a weight-bearing structure connecting landing gear to the fuselage of an aircraft. The term "lifting strut" is used to refer to airfoils which serve as landing gear struts, and also to airfoils that serve as aerodynamic fairings or shells for an enclosed landing gear strut, where the airfoils have the added function of serving as lifting elements. The term "lifting strut" is also limited to lifting elements that provide no more than about 30% of the total lift when the aircraft is in level flight, which distinguishes them from the main wings and canards of prior art aircraft.

The term "fuselage", as used herein, refers to a weight-bearing component of the body of the craft, which, depending on the method of construction, may be the outer shell of the body, a structural frame located within the shell, or a combination of the two.

"Shell" and "fairing" refer to aerodynamically-shaped outer structures enclosing aircraft components. In some embodiments, the shell may be largely or entirely designed to control airflow and/or minimize drag. In other embodiments, the shell may also be a load-bearing component, as is common in lightweight composite monocoque structures. In the present invention, when the shell encloses a landing gear strut, or itself serves as a landing gear strut, the shell is an airfoil generating both lift and drag.

"Landing gear" refers to components that contact the ground or are directly associated with such components. The term encompasses wheels, skids, pontoons, and structures having similar functions; shock absorbers, springs, and other components of suspension systems; and axles, bearings and other wheel components.

An aircraft of the invention may be constructed by any of the known methods, and from any of the known materials, that are known in the art. These include, but are not limited to, steel, aluminum, magnesium, titanium, and alloys thereof, as well as fiberglass and carbon fiber composites. The lifting struts of the invention can be affixed to an internal frame of the aircraft by known methods, including but not limited to bolts, screws, rivets, clamps, and welding. Attachment to the external shell may likewise be accomplished by any of the methods known in the art, including the above-listed mechanical fasteners, as well as adhesives, and combinations thereof. The lifting struts may optionally be integral with an external monocoque shell, or alternatively left and right lifting struts may be integral with one another so as to form a monolithic winglike structure, which is subsequently attached to the frame and/or shell of the aircraft.

The aircraft can be of any existing size or design, and may have propeller, jet, turbofan, or electric propulsion. A class of aircraft that particularly benefits from the present invention is compact personal aircraft having a short wingspan, such as the VTOL (vertical takeoff and landing) craft shown in the present drawings.

The invention, broadly speaking, is a lifting element for an aircraft, which simultaneously serves as a landing gear strut or as the surrounding shell for a landing gear strut. These lifting elements are referred to as lifting struts. Lifting struts have a proximal end attached, directly or indirectly, to the fuselage of the aircraft, and a distal end to which the additional landing gear components is attached. The strut is a weight bearing structure that either has a cross-section in the shape of an airfoil, or is enclosed within a shell having a cross-section in the shape of an airfoil. Such a shell may be constructed from metal, preferably an aluminum or magnesium alloy, or from a fiber-reinforced composite such as fiberglass or a carbon fiber-reinforced polymer. The invention differs from the superficially similar wingtip wheels of the above-mentioned Quickie and Dragonfly aircraft in both size and purpose. The struts of the present invention provide additional primary lift to the craft, on the order of 20% to 30% of the total lift, whereas the prior art canard wings may supply 50-65% of the total lift. When applied to aircraft having canard and main wings, or tandem wings, the present invention provides a third wing, raising the total lift surface achievable within a given wing span. This third wing improves longitudinal stability by increasing the effective aspect ratio of the wings aft of the center of gravity. Preferably, the lifting struts of the present invention do not have moveable control surfaces such as flaps or ailerons.

A lifting strut of the invention extends outward, and preferably also extends downward, from the fuselage of the aircraft. The downward angle of the lifting strut, as measured from the horizontal, may range from zero to 45°, preferably from zero to about 30°, and more preferably from zero to about 20°. Ranges of from 5° to 45°, from 5° to about 30°, and from 5° to about 20° and from 10° to 45°, from 10° to about 30°, and from 10° to about 20° are also contemplated. An angle of 0° would provide the most lift, but in order to allow the landing gear to provide adequate ground clearance for the aircraft, some degree of downward angle will generally be necessary. In embodiments where the two airfoils extend at a downward angle, they effectively constitute an anhedral wing, which may contribute to roll instability; this effect can be minimized by employing as small a downward angle as is practicable. In alternative embodiments, the lifting struts may extend at an upward angle, creating a dihedral wing; in such embodiments (and in cases of a zero or minimal downward angle) the invention encompasses the use of downward vertical extensions at the distal ends of the lifting struts, which provide adequate ground clearance while permitting extension of the struts at a zero or upwards angle.

In addition to the provision of additional lift, a hollow airfoil lifting strut of the invention may be engineered with a degree of flexibility sufficient to largely or completely absorb the forces generated upon landing of the aircraft. Such embodiments enable weight saving, by reducing or eliminating the mass of a conventional suspension system.

The lifting struts of the invention are longer than conventional landing gear struts, which enables a significant increase in the distance between the rear wheels. The invention thereby provides greater stability on the ground, making the aircraft more resistant to forces that threaten to tilt or even flip the craft, such as might be encountered when landing or parking on a slope, from high winds, or due to excessively hard braking.

FIG. 1 is a front view of a VTOL aircraft 1 equipped with port and starboard landing gear lifting struts 2a and 2b, respectively. At the distal end of the lifting struts are landing gear components, which in the embodiment shown are wheels 3a and 3b. The lifting struts are mounted to the fuselage 4 an angle θ from the horizontal. In the embodiment shown, the angle θ may have a range of 10-20°. As of the present filing date, a range of 12° to 18° appears to be most preferable.

Figure 2:
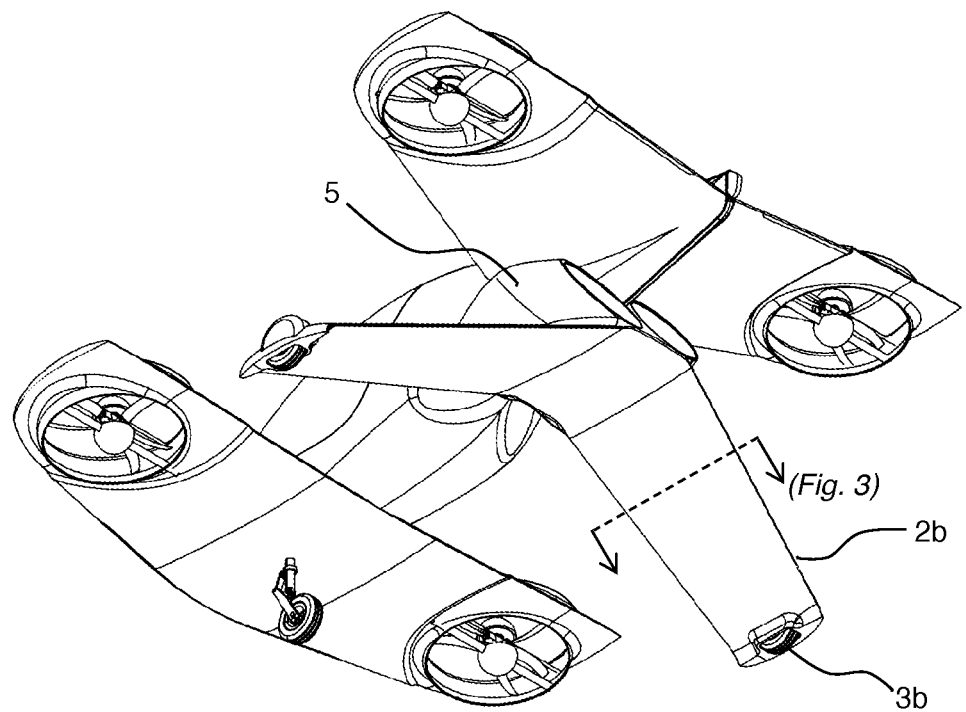
FIG. 2 is a perspective view, from below, of a personal aircraft fitted with two landing gear lifting struts of the invention.

FIG. 2 shows a perspective view of the same aircraft, as seen from below and from the rear. The lifting struts in this embodiment can be seen to have a slight forward sweep, but unswept and rearward-swept lifting struts are alternative configurations. A forward sweep is expected to have a slightly increased lift coefficient, due to the fuselage acting as a fence against the resulting inward spanwise airflow. The sweep angle, if any, and the placement of the lifting struts on the fuselage, must also take into account the center of gravity of the aircraft, which is most desirably located at or near the center of the triangle defined by the full landing gear footprint, and the center of pressure during forward flight. An additional benefit of the lifting struts of the invention is that a third primary lifting surface affords the designer more flexibility over where the center of pressure is located.

The representative aircraft shown in the drawings is fitted with pusher propellers located within nacelles 5. For the purposes of this description, the propeller nacelles 5, to which the lifting struts 2a and 2b are attached, may be considered to be a part of the fuselage, or as examples of the indirect attachment of the lifting struts to the fuselage. This particular aircraft can be classified as having a tandem wing, and the lifting struts of the invention in this case serve as a third lifting element, which is most preferably located between the tandem wings.

Figure 3:
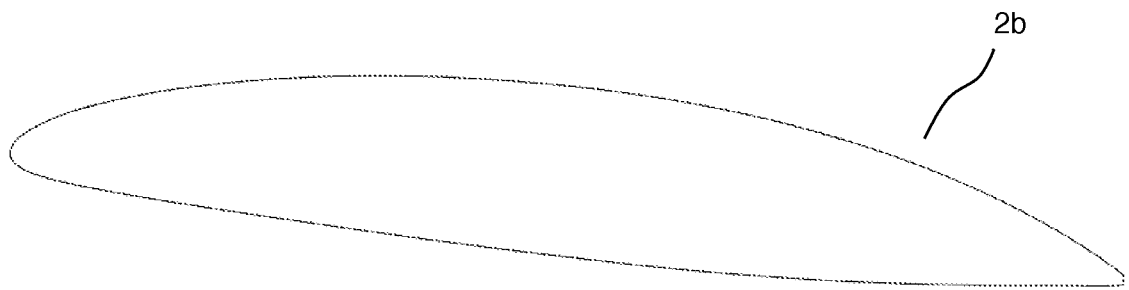
FIG. 3 is a cross-section of the lifting strut shown in FIG. 2.

FIG. 3 is the airfoil cross-section of lifting strut 2b, as marked in FIG. 2. The embodiment shown has the profile of a NACA 16-815 airfoil. This is a NACA 1-series airfoil with the region of minimum pressure being located 60% along the chord, a designed coefficient of lift of 0.8, and a T/C (thickness/chord) ratio of 15%. Alternative embodiments may employ any airfoil that provides effective lift at the anticipated airspeeds.

In addition to having an airfoil profile, the lifting struts 2a and 2b may also generate lift by virtue of having a positive angle of attack relative to the oncoming flow of air. The angle of attack (not shown in the drawings) is a function of the orientation of the lifting struts relative to the forward velocity vector, or to the direction of the oncoming airflow. As is known in the art, the airfoil profile, camber, and/or angle of attack may optionally be varied over the length of the lifting strut in order to improve, for example, stall and stall recovery characteristics.

The invention has been described and illustrated by way of specific embodiments, but is not limited to these illustrative examples. Alternatives and equivalents of various aspects and components of the invention will be apparent to those of skill in the art, and such modifications are contemplated to be within the scope of the invention, which is limited only by the claims. The claims are intended to encompass any and all equivalents, other than any that have been explicitly disclaimed by the applicant.

We claim:

1. A landing gear strut for an aircraft, the landing gear strut
   having proximal and distal ends, the proximal end being attached to the fuselage of the aircraft,
   the strut projecting outward from the fuselage, and
   the strut having landing gear components attached to the distal end thereof, wherein the strut is a weight-bearing structure that has a cross-section in the shape of a lifting airfoil having a positive camber.

2. The lifting landing gear strut of claim 1, wherein the aircraft is a VTOL aircraft.

3. The landing gear strut of claim 2, wherein the strut projects downward from the fuselage at an angle θ of less than 45° from the horizontal.

4. The landing gear strut of claim 3, wherein the strut projects downward from the fuselage at an angle θ of less than 30° from the horizontal.

5. The landing gear strut of claim 4, wherein the strut projects downward from the fuselage at an angle θ of less than 20° from the horizontal.

6. The landing gear strut of claim 5, wherein the airfoil presents a positive angle of attack when the aircraft is moving forward.

7. The landing gear strut of claim 4, wherein the airfoil presents a positive angle of attack when the aircraft is moving forward.

8. The landing gear strut of claim 3, wherein the airfoil presents a positive angle of attack when the aircraft is moving forward.

9. The landing gear strut of claim 2, wherein the airfoil presents a positive angle of attack when the aircraft is moving forward.

10. The landing gear strut of claim 1, wherein the strut projects downward from the fuselage at an angle θ of less than 45° from the horizontal.

11. The landing gear strut of claim 10, wherein the strut projects downward from the fuselage at an angle θ of less than 30° from the horizontal.

12. The landing gear strut of claim 11, wherein the strut projects downward from the fuselage at an angle θ of less than 20° from the horizontal.

13. The landing gear strut of claim 12, wherein the airfoil presents a positive angle of attack when the aircraft is moving forward.

14. The landing gear strut of claim 11, wherein the airfoil presents a positive angle of attack when the aircraft is moving forward.

15. The landing gear strut of claim 10, wherein the airfoil presents a positive angle of attack when the aircraft is moving forward.

16. The landing gear strut of claim 1, wherein the airfoil presents a positive angle of attack when the aircraft is moving forward.

* * * * *